(12) United States Patent
Sardella et al.

(10) Patent No.: US 7,263,569 B1
(45) Date of Patent: Aug. 28, 2007

(54) METHOD AND SYSTEM FOR DISTRIBUTING POWER IN A COMPUTER SYSTEM

(75) Inventors: Steven D. Sardella, Marlborough, MA (US); Douglas Sullivan, Hopkinton, MA (US); Stephen E. Strickland, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/955,354

(22) Filed: Sep. 30, 2004

(51) Int. Cl.
*G06F 1/24* (2006.01)
*G06F 1/26* (2006.01)
*G06F 11/00* (2006.01)

(52) U.S. Cl. .................. 710/302; 713/2; 713/300; 714/14

(58) Field of Classification Search ........ 710/300–304, 710/104, 10, 15; 713/1, 2, 300, 310, 324; 340/568.3, 653; 361/679, 686; 323/299; 307/85; 714/2, 14
See application file for complete search history.

(56) References Cited

U.S. PATENT DOCUMENTS

| | | | | |
|---|---|---|---|---|
| 4,835,737 A | * | 5/1989 | Herrig et al. | ................ 710/302 |
| 5,473,499 A | * | 12/1995 | Weir | ............................ 361/58 |
| 5,568,610 A | * | 10/1996 | Brown | .......................... 714/48 |
| 5,584,030 A | * | 12/1996 | Husak et al. | ................ 713/300 |
| 5,862,393 A | * | 1/1999 | Davis | .......................... 713/300 |
| 5,922,060 A | * | 7/1999 | Goodrum | ..................... 710/302 |
| 6,105,090 A | * | 8/2000 | Fosmo | ....................... 710/302 |
| 6,718,472 B1 | * | 4/2004 | Garnett | ....................... 713/300 |
| 2005/0062606 A1 | * | 3/2005 | Konecnik | ................ 340/568.3 |
| 2005/0078467 A1 | * | 4/2005 | Barr et al. | ................... 361/816 |

OTHER PUBLICATIONS

"Directional ground-fault indicator for high-resistsmce grounded systems" by Baldwin et al. (abstract only) Publication Datw: Mar.-Apr. 2003.*

* cited by examiner

*Primary Examiner*—Gopal C. Ray
(74) *Attorney, Agent, or Firm*—Krishnendu Gupta; Scott A. Quellette

(57) ABSTRACT

An apparatus for distributing power in a computer system includes a power supply device; a processing device including a CPU module and a plurality of I/O modules; and an insert line coupled between the power supply and the processing device. The insert line is connected to each of the CPU module and the plurality of I/O modules before terminating at a ground connection within the processing device. The CPU module and the plurality of I/O modules are powered by the power supply. When one of the CPU module and the plurality of I/O modules is removed from the processing device, the power supply senses that the insert line is no longer grounded, and removes power from the CPU module and the plurality of I/O modules.

12 Claims, 3 Drawing Sheets

METHOD AND SYSTEM FOR DISTRIBUTING POWER IN A COMPUTER SYSTEM

FIELD OF THE INVENTION

The present invention is directed generally to a method and system for distributing power in a computer system and, more particularly, to a method and system for insuring that all required components of a computer system are present before power is supplied to the system.

BACKGROUND OF THE INVENTION

A data storage system stores and retrieves information on behalf of one or more external host computers. A typical data storage system includes power supply circuitry, a storage processing device, and a set of disk drives. The power supply circuitry provides power to the storage processing device, thus enabling the storage processing device to load data into and retrieve data from the set of disk drives on behalf of the external host computers.

Typically, the storage processing device includes several sub-components, called field replaceable units ("FRUs"), for performing various functions of the storage processing device. These FRUs are designed and integrated into the storage processing device in a way that enables them to be replaced at the location of the data storage system, thereby eliminating the need to move the entire data storage system to a repair facility to perform the replacement of the failed sub-component. These FRUs can include a CPU module, I/O devices, memory modules and power supply modules. Typically, one of the I/O modules controls communications between the CPU module and the set of disk drives and another I/O module controls communications between the CPU module and the external host computers. In the event that one of the I/O module FRUs is removed from the storage processing device, the operation of the storage processing device should be ceased, so that the I/O module can be replaced, to minimize the chances of any data being lost.

SUMMARY OF THE INVENTION

The invention provides a system for distributing power in a computer system which monitors the attachment of FRUs to and the removal of FRUs from the computer system. A storage processor, which includes a CPU module and two I/O modules, is connected to a power source through a midplane. An insert signal line loops from the power supply through the CPU module and both I/O modules before being terminated at a ground connection within the storage processor. If the CPU module and both I/O modules are present, the insert signal line is grounded and the storage processor receives power from the power supply. If the power supply senses that the insert signal line is floating, it determines that at least one of the CPU module and/or I/O modules has been removed, and the storage processor is powered down. An I/O annex may be connected to the storage processor through the midplane. A second insert signal line is connected between the CPU module and a ground connection on the midplane through the I/O annex. If the I/O annex is physically removed from the system, the CPU module reboots and the I/O annex is not enumerated by the CPU module. If an I/O annex is inserted during operation of the storage processor, the CPU module will mark the I/O annex as being present, but the I/O annex will not be enumerated until the CPU module is rebooted.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. In instances where identical components that are designated as "XA" and "XB" are referred to simply as "X", it will be understood that both components are being referred to. The drawings are not necessarily to scale, emphasis instead being placed upon illustrating the principles of the invention.

DETAILED DESCRIPTION

Figure 1:
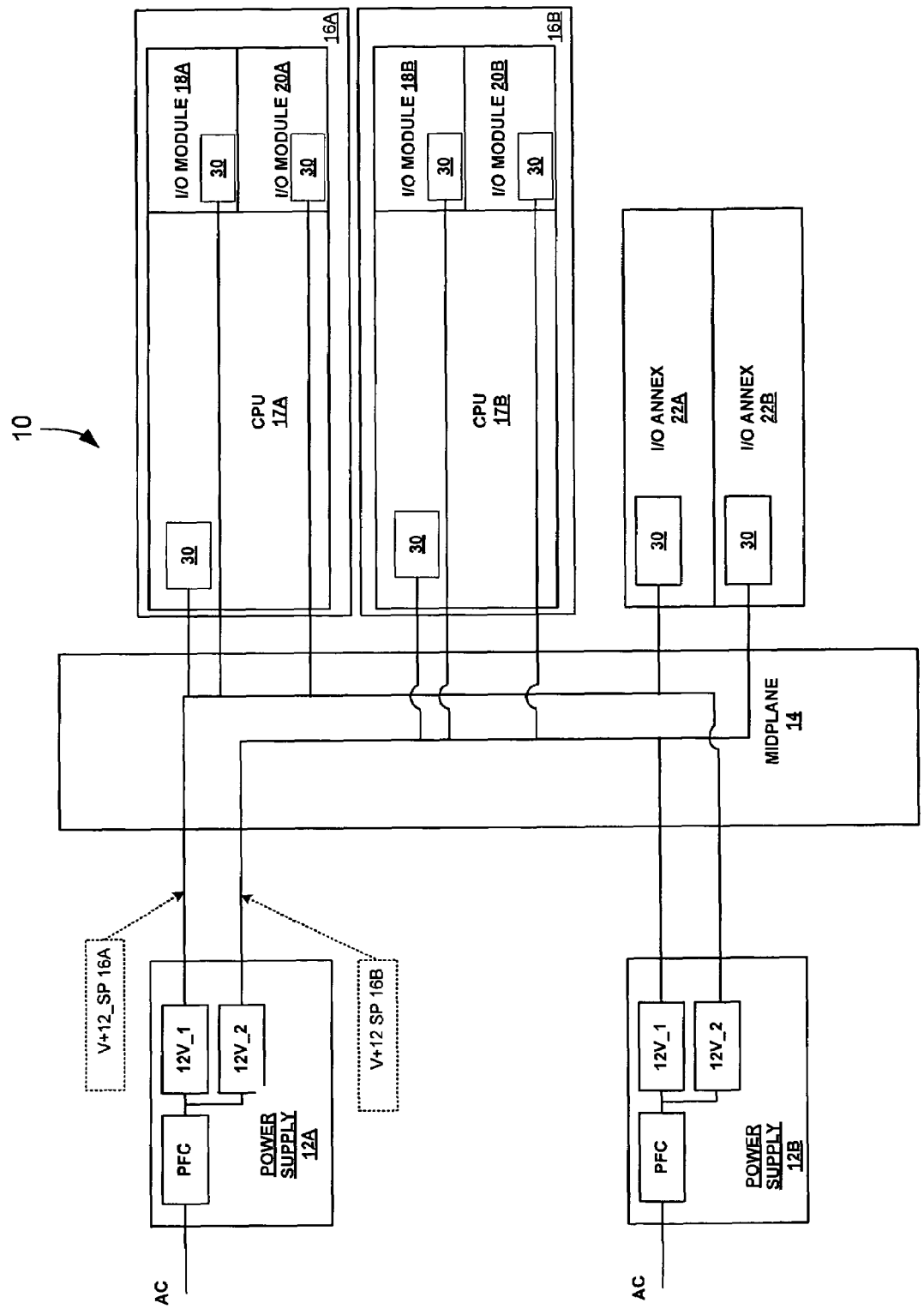
FIG. 1 is a schematic diagram of a storage processing system that is utilized in accordance with the present invention.

FIG. 1 is a schematic diagram of a storage processing device 10 of a data storage system in accordance with the invention. In one embodiment, the storage processing device 10 includes redundant power supplies 12A and 12B, a midplane 14, a storage processor 16A including CPU module 17A and I/O modules 18A and 20A and a storage processor 16B including CPU module 17B and I/O modules 18B and 20B. Storage processing device 10 further includes I/O annexes 22A and 22B. In one embodiment, the I/O modules 18 comprise a Fibre Channel device and the I/O modules 20 comprise a Gigabit Ethernet device.

As shown in FIG. 1, each power supply 12A, 12B receives an AC input and outputs two 12 volts DC outputs, 12V_1 and 12V_2. Output 12V_1 of power supply 16A supplies power through the midplane 14 to power distribution devices 30 in each of the storage processor 16A, I/O modules 18A and 20A and I/O annex 22A. Output 12V_2 of power supply 16A supplies power through the midplane 14 to storage processor 16B, I/O modules 18B and 20B and I/O annex 22B. Power supply 12B also supplies a 12 volt DC signal to the storage processors 16, the I/O modules 18 and 20 and the I/O annexes 22 in a redundant manner.

The I/O annex 22 operates as a third I/O module for each of the storage processors 16. Typically, each I/O module is coupled to its storage processor by one of three X8 PCI-Express links (not shown). Since, in a network-attached storage ("NAS") system, the storage processors do not communicate with each other, one of the three X8 PCI-Express links is not utilized. The addition of the I/O annex provides greater I/O efficiency, by utilizing the previously unused PCI-Express link.

As described above, each of the storage processors, I/O modules and I/O annexes are separately replaceable in the event that one of them fails to operate properly. However, in order to power on and operate properly, the storage processor 16 must have its CPU module 17 and both I/O modules 18 and 20 present and connected to each other. In order to insure that the storage processor 16 has its CPU module 17 and both I/O modules 18 and 20 present and connected to each other, the invention includes means for disconnecting the power from the storage processor 16 in the event that one or more of the CPU module 17 and I/O modules 18 and 20 are removed from the storage processor 16.

Figure 2:
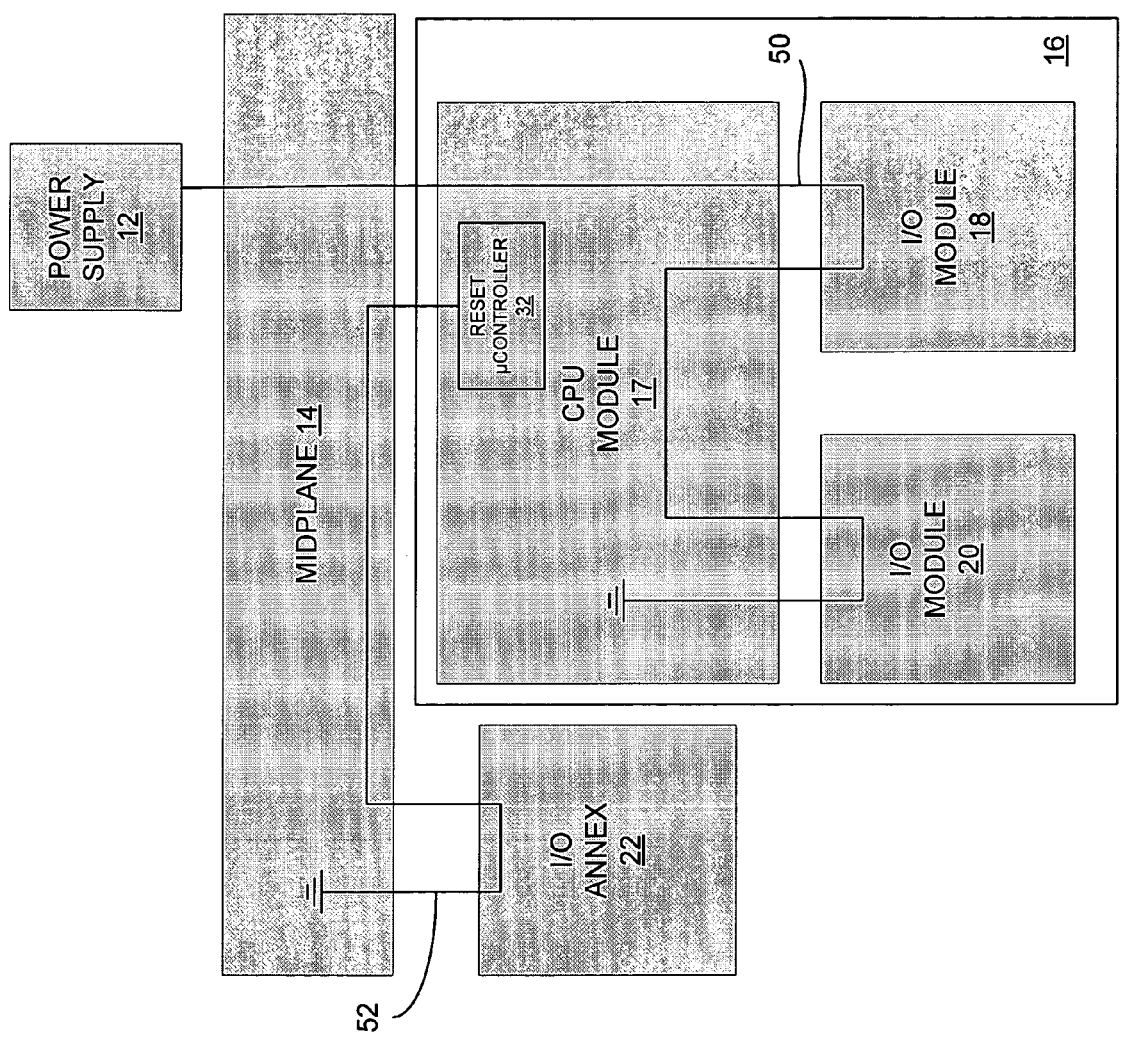
FIG. 2 is a schematic diagram of the system for distributing power in a computer system in accordance with the present invention.

FIG. 2 is a schematic diagram of the invention including the power supply 12, midplane 14, storage processor 16, including CPU module 17, I/O module 18 and I/O module 20 and I/O annex 22. A reset microcontroller 32 is located on the CPU module 17. Also shown in FIG. 2 is a first insert signal line 50, which is connected through the midplane 14 between the power supply 12 and the storage processor 16 and a second insert signal line 52 connected through the midplane 14 between the I/O annex 22 and the reset microcontroller 32. At one end, the insert signal line 50 loops through the CPU module 17, into the I/O module 18, back into the CPU module 17, into the I/O module 20 and back into the CPU module 17, where it terminates at a ground connection. The other end of the insert signal line 50 is connected to the power supply 12. As described below, reset microcontroller 32 monitors insert signals on the insert signal lines 50 and 52.

In operation, an insert signal is output from the midplane 14 along insert line 50. The power supply 12 monitors the status of the insert signal to insure that all of the components of the storage processor 16 are present. As long as the power supply 12 senses that the insert signal is grounded, i.e., the loop through the CPU module 17 and the I/O modules 18 and 20 is intact, the power supply 12 supplies power to the storage processor 16, as well as the I/O annex 22. However, in the event that the insert signal begins to float, thus indicating that the insert line 50 has become broken, the power supply 12 senses that one of the CPU module 17 and the I/O modules 18 and 20 has been removed. The power supply 12 then removes power from the storage processor 16, as well as the I/O annex 22.

Since the I/O annex 22 is not included in the storage processor 16 and thus is not critical for the proper operation of the storage processor 16, it is designed to be "hot-swappable," i.e., it can be removed from or inserted into the system while the data storage device is operating, without affecting the supply of power to the storage processor 16. However, it is important for the storage processor 16 to be made aware of the insertion or removal of the I/O annex 22 so that it knows whether it can utilize the resources provided by the I/O annex 22. Accordingly, the second insert signal line 52 is looped from the midplane 14 through the I/O annex 22 and back into the midplane 14, where it is terminated at a ground connection. The other end of the insert signal line 52 is connected to the reset microcontroller 32.

In operation, the second insert signal is output from the midplane 14 along insert line 52. The reset microcontroller 32 monitors the status of the insert signal to determine whether the I/O annex 22 is present. As long as the reset microcontroller 32 senses that the insert signal on insert line 52 is grounded, i.e., the loop through I/O annex 22 is intact, the reset microcontroller 32 allows the storage processor 16 and the I/O annex to operate normally. However, in the event that the second insert signal on insert line 52 begins to float, thus indicating that the insert line 52 has become broken, the reset microcontroller 32 senses that the I/O annex 22 has been removed. The reset microcontroller 32 then instructs the storage processor 16 to reboot, so that when the storage processor 16 enumerates during the boot, it will acknowledge that the I/O annex 22 is no longer present. If the I/O annex 22 were then replaced, the reset microcontroller 32 would sense that the second insert signal on insert line 52 was grounded, thus indicating the present of the I/O annex 22. However, while the I/O annex 22 will be powered by the power supply 12, it will not be included in the storage processing system comprising the storage processor 16 until the storage processor 16 reboots and enumerates and adds the I/O annex 22 to the system. The reset microcontroller 32 then determines, based on the operational demands on the storage processor, when the storage processor 16 will reboot. Until the storage processor 16 reboots, the I/O annex 22 will be powered, but not available for use by the storage processor 16.

Figure 3:
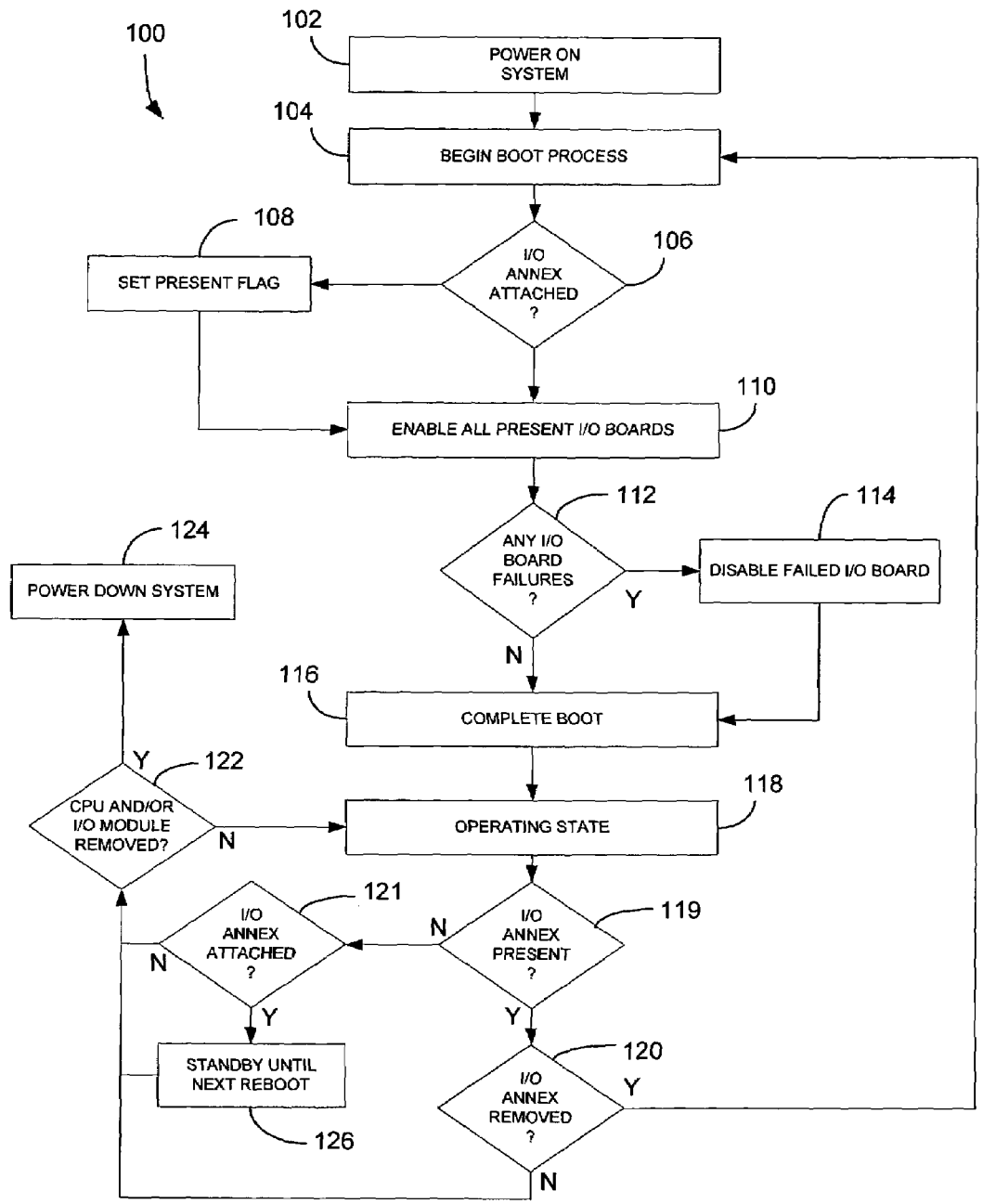
FIG. 3 is a flow diagram showing the steps involved in the method for distributing power in a computer system in accordance with the present invention.

FIG. 3 is a flow diagram 100 showing the operation of the invention. In Step 102, the data storage system 10 is powered on and the storage processor 16 begins its boot process, Step 104. While enumerating the components attached to the storage processor 16, Step 106, if the storage processor determines that the I/O annex 22 is attached, it sets a present flag in the CPU module 17, Step 108. The CPU module 17 then enables all present boards, Step 110. If no I/O module or annex failures are detected, Step 112, the storage processor 16 completes its boot process, Step 116. If, in Step 112, one of the I/O modules or annex fails, that I/O board is disabled and not included in the enumeration. The storage processor 16 then completes its boot process, Step 116. Once the storage processor 16 has completed its boot process, it enters its operating state, Step 118. In this state, the reset microcontroller 32 monitors the second insert signal lines 52, as described above, to determine whether the I/O annex has been removed, Steps 119, 120 and the power supply 12 monitors the first insert signal line 50 to determine whether the CPU module or one of the I/O modules have been removed, Step 122. As long as the power supply 12 determines that the CPU module 17 and I/O modules 18,20 are present, the storage processor 16 remains in its operating state. Also, as long as the reset microcontroller 32 determines that the I/O annex 22 is present/not removed, it allows the storage processor to operate normally. However, if the second insert signal line 52 begins to float, indicating that the I/O annex has been removed, Step 120, the reset microcontroller 32 instructs the storage processor to begin the boot process (reboot), Step 104. During the booting process, since the I/O annex 22 is no longer attached, Step 106 it will not be enabled in Step 110. If, in Step 122, the power supply 12 senses that the first insert signal line 50 has begun floating, indicating that one or more of the CPU module and the I/O modules have been removed, Step 122, the storage processor 16 is powered down, Step 124.

If, in Step 119, it is determined that the I/O annex 22 is not present, the reset microcontroller 32 then determines whether one has been attached, Step 121. If an I/O annex has been attached, the I/O annex is placed in a standby mode and will wait until the reset microcontroller 32 instructs the storage processor 16 to reboot before it will be included in the system, Step 126.

In the case where the I/O annex is attached in Step 121, and the storage processor 16 enters Step 118, the storage processor will not acknowledge the presence of the I/O annex 22 in Step 119, because the I/O annex will not have yet been enumerated. Therefore, if the I/O annex is later removed before the storage processor is rebooted, the storage processor will not be affected.

Accordingly, the invention provides a system for monitoring the presence of components of the data storage system and taking the appropriate action when one of the components is removed or attached. The storage processor will not power on until the CPU module and both I/O modules are present. In the case where one of the CPU module or I/O modules is removed from the storage processor while it is operating, the storage processor is powered down. In the case where an I/O annex is present during the operation of the storage processor and then is removed, the storage processor is rebooted, so that the storage processor will not enumerate the I/O annex upon rebooting. In the case where an I/O annex is attached during the operation of the storage processor, it is put in a standby mode until the storage processor is rebooted and the I/O annex can be enumerated into the storage processor.

The invention may be embodied in other specific forms without departing from the spirit or essential characteristics thereof. For example, while the first insert line is shown and described as being connected through the CPU module 17, out to the I/O module 18, back into the CPU module 17, out to the I/O module 18 and back into the CPU module 17, it will be understood that the first insert line can be connected through the CPU module and the I/O modules in any order, as long as it is connected through each module and terminates at a ground connection. For example, the first insert line may be coupled from the midplane through one I/O module, then through the other I/O module and then to the CPU module ground connection. It could also be coupled from the midplane through one I/O module, then through the CPU module and then to a ground connection in the other I/O module. The ground connection at which the first insert line terminates could also be in either of the CPU or I/O modules. The ground connection at which the second insert line terminates could also be in either the I/O annex or in the midplane. Furthermore, subcomponents other than those specifically shown and described may be monitored by the present invention. For example, the invention is capable of monitoring and reporting the failure of blower modules, power supplies and any other subcomponents of the data storage system. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. An apparatus for distributing power in a computer system comprising:
 a power supply device;
 a processing device including a CPU module and a plurality of I/O modules; and
 an insert line, carrying an insert signal, coupled between the power supply and the processing device, the insert line being connected to each of the CPU module and the plurality of I/O modules before terminating at a ground connection within the CPU module;
 wherein, the CPU module and the plurality of I/O modules are powered by the power supply; and
 wherein, when one or more of the CPU module] and the plurality of I/O modules is removed from the processing device, the power supply senses that the insert line is no longer grounded, and removes power from the CPU module and the plurality of I/O modules.

2. The apparatus of claim 1 wherein the processing device includes a reset device and the apparatus further includes:
 an I/O annex coupled to the power supply for receiving power therefrom; and
 a second grounded insert line coupled between the reset device and the I/O annex such that, when the I/O annex is removed from the apparatus, the reset device causes the processing device to reboot.

3. The apparatus of claim 1 wherein the power supply is a redundant power supply.

4. The apparatus of claim 1 further including a midplane coupled between the power supply device and the processing devise.

5. The apparatus of claim 4 wherein the processing device includes a reset device and apparatus is configured to receive an I/O annex at a connection point of the apparatus, the apparatus further including:
 a second insert line coupled to the reset device and a first terminal of the connection point through the midplane, the second insert line carrying a second insert signal; and
 a third insert line extending from a second terminal of the connection point to a ground connection within the midplane;
 wherein, when an I/O annex is connected to the first and second terminals of the connection point, the second insert line and the third insert line are coupled together, causing the reset device to sense that the second insert line is grounded, which causes the reset device to instruct the processing device to supply power to the I/O annex.

6. The apparatus of claim 4 wherein the processing device includes a reset device, the apparatus further including:
 an I/O annex coupled to the power supply for receiving power therefrom; and
 a second insert line coupled to the reset device and the I/O annex through the midplane, the second insert line carrying a second insert signal;
 wherein, when the I/O annex is removed from the apparatus, the reset device causes the processing device to reboot.

7. The apparatus of claim 6 wherein the power supply is a redundant power supply.

8. The apparatus of claim 6 wherein the second insert line extends from the reset device to the midplane and from the midplane to the I/O annex, before terminating at a ground connection within the midplane.

9. The apparatus of claim 8 wherein, when the I/O annex is removed from the apparatus, the reset device senses that the second insert line is no longer grounded, and instructs the processing device to reboot.

10. An apparatus for distributing power in a computer system comprising:
 a power supply device;
 a processing device including a CPU module and a plurality of I/O modules; and
 an insert line coupled between the power supply and the processing device, the insert line being connected to each of the CPU module and the plurality of I/O modules before terminating at a ground connection within the CPU module;
 wherein, the CPU module and the plurality of I/O modules are configured to be powered by the power supply; and
 wherein, when the power supply senses that the insert line is not grounded, the power supply does not supply power to the processing device.

11. The apparatus of claim 10, wherein the absence of one or more of the CPU module and I/O modules causes the insert line to not be grounded.

12. A method for distributing power in a computer system including a power supply, a processing device including a CPU module and a plurality of I/O modules, each configured to receive power from the Power Supply, an insert line coupled between the power supply and the processing device, the insert line being connected to each of the CPU module and the plurality of I/O modules before terminating at a ground connection in the CPU module, the method comprising:

A. monitoring the insert line to determine whether it is grounded; and

B. supplying power from the power supply to the CPU module and the plurality of I/O modules when the insert line is grounded.

* * * * *